UNITED STATES PATENT OFFICE.

HUGO LIEBER, OF NEW YORK, N. Y.

PLASTIC COMPOSITION AND PROCESS OF MAKING THE SAME.

1,213,115. Specification of Letters Patent. Patented Jan. 16, 1917.

No Drawing. Application filed March 28, 1914. Serial No. 827,914.

*To all whom it may concern:*

Be it known that I, HUGO LIEBER, a citizen of the United States, residing at New York city, in the county of New York and State of New York, have invented certain new and useful Improvements in Plastic Compositions and Processes of Making the Same, fully described and represented in the following specification.

This invention relates to a new composition of matter having peat as its principal constituent or base, and to a method of making the same.

The object of the invention is to provide at a reasonable cost a valuable material or substance which in its final state shall be solid and to a considerable degree elastic, and which shall possess characteristics making it valuable for a great variety of uses as a substitute for wood and other materials.

In making the material, I produce in or mix with the quantity of peat to be treated a suitable quantity of the cellulose derivative known as viscose, sufficient water being provided in the mixture to secure solution or distention of the viscose and its thorough distribution through the whole mass. The mass is then treated to drive out the excess water, to consolidate it and to cause the viscose to decompose or revert to the gelatinous or homogeneous form of cellulose known as viscoid cellulose.

Peat as taken from the peat bog has a greater or less percentage of clay and other earthy matter mixed with it and contains a large amount of water. For producing my product, it is usually desirable to separate from the peat the earthy matter, and this may be accomplished by any suitable method of washing. The washed or cleaned peat is then best dried by a suitable process which drying need not, however, be carried to an extreme degree, peat containing roughly from 20% to 80% of water being in a suitable condition for further treatment according to my process. The washed or cleaned peat is made up principally of peat fiber and peat fines or dust, the proportion of fiber varying according to the character of the peat. Both the fiber and the fines or dust contain a considerable amount of cellulose, and it is largely the presence of the cellulose which makes the peat especially adaptable to my purpose, both in providing the base from which a binding agent is readily produced and also in connection with the fibrous character of the peat in rendering the peat especially suitable for production with the aid of the binding agent of a solid highly cohesive and sufficiently elastic material or substance to serve as a substitute for wood and other materials, the high tensile strength of the solid material resulting from the presence of the interlocking peat fibers and the strong cohesion between the viscoid cellulose and the untreated cellulose-containing peat.

In producing my improved material or composition of matter in a way that I consider best at the present time, I treat separately from the whole amount of peat which is to be used in producing the material, a relatively small amount of peat to change part or all of its cellulose into viscose by mixing with it a concentrated solution of caustic alkali, and then subjecting the alkali cellulose mass thus produced to the action of carbon bisulfid vapors to change the alkali cellulose to viscose. These operations may be carried on in the usual manner of producing viscose from cellulose, the temperature of the mass during the treatment with the caustic alkali being best kept low to accelerate the action, and the temperature being slightly raised during treatment with carbon bisulfid. It is desirable to use such an amount of caustic alkali that all or substantially all of the cellulose in the amount of peat being treated shall be converted into viscose, since a lesser amount of peat proportionate to the total amount with which it is to be ultimately mixed may thus be used. Any excess of the alkali solution may be drained off before the bisulfid of carbon treatment. I prefer to use caustic soda, although caustic potash or other suitable alkali may be used. When the viscose is produced in this way by treatment of an amount of peat to be afterward mixed with another amount of untreated peat, it is best to make use of the finer portions of the peat, or peat fines or dust, for this purpose, since a larger proportion of the peat fiber will thus be available to give strength to the final product. The peat fiber and the peat fines are readily separated by the ordinary sifting operation when the peat has been sufficiently dried.

The viscose containing mass thus produced is added to the larger amount of peat and thoroughly mixed therewith with the aid of sufficient water to insure a thorough dissemination of the viscose through the whole mass or body of peat. Viscose is readily soluble in water, but the solution is not stable, the viscose first precipitating or setting and finally reverting to the form of cellulose known as viscoid cellulose. The water therefore not only aids in securing the desired thorough mixing and distribution of the viscose with the whole mass of peat, but also is of importance in effecting the decomposition of the viscose into the insoluble form of cellulose which is present in the final product as a binder. The thoroughly mixed mass, preferably after being allowed to stand for a few hours, is subjected to pressure by any suitable means to force out water and to consolidate the mass into a solid body which is then further dried, heat being most desirably used to hasten the drying and to assist in the reversion of the viscose to viscoid cellulose. The reversion of the viscose may of course be effected or assisted by other means.

The resulting solid material is of a density varying according to the degree of compression of the mass, the character of the peat used, and the proportionate amount of the cellulose of the peat which was changed into viscose. It may be worked, finished and otherwise treated in substantially the same way as wood, and it has the advantage that it will not readily crack or split, and when made from peat having a good percentage of fiber it has a high tensile strength. It is a good non-conductor of heat and electricity.

The proportionate amount of viscose to the whole amount of peat used may be varied widely according to the desired character of the product to make it most suitable to the uses for which it is intended. A material suitable for general use as a wood substitute made from washed or cleaned peat may be produced from peat containing a good percentage of fiber and in the neighborhood of from 15% to 50% of cellulose by treating with caustic soda and carbon bisulfid an amount of peat fines separated from such peat equal to from 2% to 10% of the whole amount of peat to be used in the mixture, the treatment being such as to convert substantially all of the cellulose of the treated peat into viscose. The exact proportionate amount of peat to be so treated will depend on the cellulose content of the peat and the desired character of the product.

Instead of producing the viscose by treating a suitable amount of peat separately from the whole amount to be used in making a batch of material, the concentrated lye may be added directly to the whole amount of peat to be used, the whole mass being then mixed and exposed to the carbon bisulfid vapors. In such case, only so much lye should be used as will convert the desired amount of cellulose of the peat into alkali cellulose for the production of viscose. For a material for general use as a wood substitute, I consider it best to use sufficient lye to convert from 2% to 10% of the cellulose of the peat. While this way of supplying the viscose has some advantages and may in some cases be the most desirable, the separate treatment of a suitable amount of peat to be afterward mixed with a larger amount of untreated peat is, according to my present opinion, most advantageous, principally on grounds of economy, but also because by using the finer portions of the peat for separate treatment the full advantage of the fibrous character of the peat in giving strength to the solid material produced is retained, this consideration being of more especial importance when a comparatively large proportionate amount of viscose is used in the whole mass. It should be noted in this connection, also, that even when the viscose is produced directly in the whole amount of peat used, the finer portions of the peat will be more largely attacked by the alkali than the peat fiber; and it is to be understood that the production of my material or composition of matter by producing the viscose directly in the whole amount of peat used and the product so produced are within the broader scope of my invention.

Viscose produced from other materials, as from wood saw dust, for example, may also be used to provide the binding agent for the compressed peat, but there seems to be a considerable advantage in the use of viscose produced by the treatment of a part or the whole of the peat itself, due probably to the character of the constituents of the peat other than cellulose.

Various other substances, such, for example, as plaster of Paris, cement, silicate of soda, etc., may, of course, be added to the peat to harden or cheapen or otherwise affect the material produced and make it especially suitable for particular purposes.

What is claimed is:

1. As a composition of matter, a solid material consisting essentially of peat having incorporated therewith and disseminated therethrough a binding agent including peat which has been subjected to the viscose process.

2. As a composition of matter, a solid material comprising fibrous peat and having incorporated therewith and disseminated therethrough a binding agent comprising peat fines treated by the viscose process.

3. As a composition of matter, a solid material comprising peat and a binding agent including an adhesive material formed from peat distributed through the mass.

4. As a composition of matter, a solid material comprising peat and an adhesive material formed from peat distributed through the mass as a binding agent.

5. As a composition of matter, a solid material consisting essentially of peat of which a portion has been converted into viscoid cellulose and binds the unconverted portion together into a coherent mass.

6. As a composition of matter, a solid material comprising peat of which at least a part of the non-fibrous portion has been converted into viscoid cellulose and binds the fibrous portion together into a coherent mass.

7. As a composition of matter, a solid material comprising peat fibers united into a coherent mass by a binder consisting substantially of peat fines or dust converted largely into viscoid cellulose.

8. As a composition of matter, a solid material comprising peat and a viscoid cellulose binder intimately commingled and associated therewith.

9. The process of producing a solid material having peat as its essential ingredient which comprises treating peat to convert a portion thereof into a viscose-like state, and consolidating the resultant product into a coherent mass.

10. The process of producing a solid material having peat as its essential ingredient which comprises treating peat to convert a portion of its cellulose into an adhesive binder, and consolidating the resultant product into a coherent mass.

11. The process of producing a solid material having peat as its essential ingredient, which consists in changing a part of the cellulose of the peat into viscose, and mixing and consolidating the mass and changing the contained viscose into viscoid cellulose.

12. The process of producing a solid material having peat as its essential ingredient, which consists in changing from 2 to 10 per cent. of the cellulose of the peat into viscose, and mixing and consolidating the mass and changing the contained viscose into viscoid cellulose.

13. The process of producing a solid material having as its essential ingredient peat comprising peat fiber and peat fines, which consists in changing cellulose of the peat fines into viscose, and mixing and consolidating the mass and changing the contained viscose into viscoid cellulose.

14. The process of producing a solid material having peat as its essential ingredient, which consists in treating a part of the peat to change cellulose of the peat into viscose, mixing the material thus produced with untreated peat, and consolidating the mass and changing the contained viscose into viscoid cellulose.

15. The process of producing a solid material having peat as its essential ingredient, which consists in treating peat fines to change cellulose of the peat into viscose, mixing the material thus produced with fibrous peat, and consolidating the mass and changing the contained viscose into viscoid cellulose.

16. The process of producing a solid material having peat as its essential ingredient, which consists in treating a relatively small amount of peat fines to change substantially all of the cellulose thereof into viscose, mixing the material thus produced with a larger amount of peat comprising peat fiber, and consolidating the mass and changing the contained viscose into viscoid cellulose.

17. The process of producing a solid material having peat as its essential ingredient, which consists in changing a part of the cellulose of the peat into viscose, mixing the material with the addition of water, and consolidating and drying the mass and changing the contained viscose into viscoid cellulose.

18. The process of producing a solid material having peat as its essential ingredient, which consists in changing a part of the cellulose of the peat into viscose, and effecting reversion of the viscose in contact with unaltered peat.

19. The process of producing a solid material having peat as its essential ingredient, which consists in changing a part of the cellulose of the peat into viscose, and consolidating the resultant material into a coherent mass.

20. The process of producing a solid material having peat as its essential ingredient, which consists in cleaning and drying the peat, changing a relatively small part of the cellulose of the peat into viscose, mixing the material with the addition of water, and compressing and heating the mass to consolidate and dry it and to change the viscose into viscoid cellulose.

21. The process of producing a solid material having peat as its essential ingredient, which comprises partially converting peat into a viscose product by treating with caustic alkali and carbon bisulfid, and consolidating the resultant material into a coherent mass.

In testimony whereof I have hereunto set my hand in the presence of two subscribing witnesses.

HUGO LIEBER.

Witnesses:
A. L. KENT,
JOHN H. HAYES.